United States Patent [19]

Mix et al.

[11] Patent Number: 4,461,622
[45] Date of Patent: Jul. 24, 1984

[54] DYESTUFFS OF THE PHTHALOCYANINE SERIES, THEIR PREPARATION AND THEIR USE ON CELLULOSE

[75] Inventors: Konrad Mix, Frankfurt; Erich Feess, Hofheim, both of Fed. Rep. of Germany

[73] Assignee: Cassella Aktiengesellschaft, Frankfurt am Main, Fed. Rep. of Germany

[21] Appl. No.: 412,604

[22] Filed: Aug. 30, 1982

[30] Foreign Application Priority Data

Sep. 7, 1981 [DE] Fed. Rep. of Germany ....... 3135371

[51] Int. Cl.³ .................. C09B 47/26; D06P 3/60
[52] U.S. Cl. .......................... 8/661; 8/696; 8/918; 260/245.76; 260/245.81; 260/245.82; 260/245.85
[58] Field of Search ............... 8/661; 260/245.81

[56] References Cited

U.S. PATENT DOCUMENTS 2,395,117  2/1946  Haddock ................ 260/245.86
3,013,006  12/1961  Bienert et al. .............. 260/147
3,361,758  1/1968  Geselbracht et al. ....... 260/245.78

FOREIGN PATENT DOCUMENTS 852587  10/1952  Fed. Rep. of Germany.
510491  4/1976  U.S.S.R..

OTHER PUBLICATIONS

Chemical Abstracts, 1980, 93, 87581g.
Chemical Abstracts, 54: 6145c (1960).
Chemical Abstracts, 51: 5425c (1957).
Chemical Abstracts, 55: 6357d (1961).

*Primary Examiner*—A. Lionel Clingman
*Attorney, Agent, or Firm*—Connolly and Hutz

[57] ABSTRACT

New phthalocyanine dyestuffs of the formula

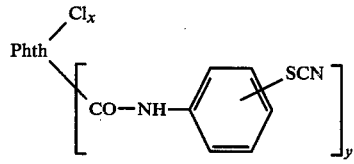

wherein Phth is a copper phthalocyanine or cobalt phthalocyanine moiety; x is a number from 0 to 3; y is a number from 1 to 4 and the sum of x and y is 4 or less; the thiocyanate group is in the meta or para-position to the amino; and addition products thereof formed with water in the presence of acids; are prepared by converting a phthalocyaninecarboxylic acid into the corresponding acid halide and condensing the acid halide with m- or p-thiocyanoaniline in an inert organic diluent; and the new dyestuffs are for dyeing and printing a material of natural or regenerated cellulose.

8 Claims, No Drawings

DYESTUFFS OF THE PHTHALOCYANINE SERIES, THEIR PREPARATION AND THEIR USE ON CELLULOSE

The invention relates to new dyestuffs of the phthalocyanine series, of the general formula I

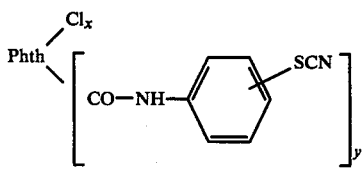

wherein Phth denotes a copper phthalocyanine or cobalt phthalocyanine radical, and x denotes a number from 0 to 3, y denotes a number from 1 to 4 and $x+y \leq 4$, and the thiocyanate group is in the m-position or p-position relative to the amino group, and to addition products thereof which may be formed with water at the thiocyanate group in the presence of acids.

The dyestuffs of the formula I according to the invention are obtained by converting phthalocyaninecarboxylic acids of the formula II

into the corresponding acid halides of the formula III

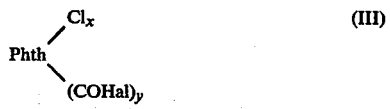

wherein Hal denotes chlorine or bromine, in a manner which is in itself known, and subjecting these halides to a condensation reaction with m- or p-thiocyanoaniline in an inert, organic diluent.

The copper or cobalt phthalocyanine-mono- to -tetracarboxylic acids used as the starting materials are prepared in known manner, for example by a process analogous to that described in Makrom. Chem. 181, 375–84 (1984), or in accordance with the teachings of French Patent Specification No. 1,546,056.

These copper or cobalt phthalocyaninecarboxylic acids are also converted into the corresponding acid halides, in particular the acid chlorides, by processes which are in themselves known, by reaction with, for example, thionyl chloride in an inert organic diluent. Examples of suitable solvents are chlorobenzene, xylene, o-dichlorobenzene, nitrobenzene and the like, and these are also suitable as diluents for the subsequent condensation reaction.

For the reaction according to the invention, m- or p-thiocyanoaniline is added to the resulting carboxylic acid halides in an inert organic diluent and the condensation reaction is carried out. The condensation already takes place at room temperature, but can be accelerated and brought to completion by heatng the mixture to elevated temperatures. It has proved expedient to carry out the condensation in the presence of an acid acceptor. Suitable acid acceptors are either excess thiocyanoaniline or known, customary acid acceptors, such as tertiary amines, for example pyridine, quinoline, triethylamine and tripropylamine. If no acid acceptor is used, the condensation can also be carried out, with stirring and heating, until the evolution of hydrogen chloride has ended.

If the carboxylic acid halide is used directly as the reaction product of the reaction between the copper or cobalt phthalocyaninecarboxylic acid and the corresponding halogenating agent, in particular thionyl chloride, excess halogenating agent is to be distilled off from the reaction mixture before the reaction with thiocyanoaniline.

The condensation mixture is worked up by separating off the dyestuffs according to the invention by filtration, rinsing them in the customary manner with a suitable solvent, for example monochlorobenzene, methanol and the like, and drying them. It is also possible for the diluent to be driven off by steam distillation when the condensation reaction has ended, and for the resulting dyestuff then to be isolated by filtration and washing with water.

Acid-catalysed addition of water to the molecule of the dyestuffs according to the invention or hydrolysis of the thiocyanate radical may occur during the condensation reaction according to the invention or during the subsequent working up (cf., in this context, Houben-Weyl, Methoden der organischen Chemie (Methods of Organic Chemistry), 4th edition, Volume IX, page 866). The precise chemical course of this addition of water has not been investigated further, since the technological properties of the dyestuffs are not substantially altered.

The dyestuffs according to the invention are insoluble in alkalis, but can be dissolved by treatment with alkaline solutions of hydrogen sulphide, glucose or, in the case of the cobalt compounds, dithionous acid, sulphoxylic acid and derivatives thereof, such as hydroxyalkanesulphinic acids, or of formamidinesulphinic acid and similar known reducing agents. The dyestuffs are absorbed from these solutions onto fibres and fabrics of natural or regenerated cellulose, and can therefore be used in accordance with the known methods of dyeing and printing cotton or regenerated cellulose with sulphur dyestuffs or vat dyestuffs. Turquoise-coloured dyeings and prints with good dyeing properties, in particular good fastnesses to washing and light, are thus obtained with the dyestuffs according to the invention. In this connection, the cobalt-containing dyestuffs according to the invention have proved to be particularly valuable, since they can be used together with both sulphur dyestuffs and vat dyestuffs.

Compared with the most closely comparable phthalocyanine dyestuffs containing the thiocyano groups bonded via a sulphonamidoaryl radical, such as are described in the Japanese publications referred to in CA. No. 55, 6357d and CA. No. 51, 5425c, the new dyestuffs according to the invention are advantageous and superior since they can be produced by a non-polluting preparation and have better fastness properties, especially in respect of fastness to wet processing.

EXAMPLE 1

90 g of cobalt phthalocyaninedicarboxylic acid monohydrate (prepared by condensation of phthalic anhydride and trimellitic anhydride, in a molar ratio of 1:1, with cobalt chloride, ammonium molybdate and urea in nitrobenzene at 190°–95° C. and subsequent hydrolysis of the resulting diamide with sodium hydroxide solution at elevated temperature) are finely powdered and suspended in 1,250 ml of chlorobenzene. After 60 ml of thionyl chloride have been added, the mixture is stirred under a reflux condenser at 80° C. and at 110° C., in each case for 6 hours. Excess thionyl chloride is then distilled off, together with a little chlorobenzene, up to a boiling point of 131°–132°. When the mixture has been cooled to room temperature, 48 g of p-thiocyanoaniline are added to the suspension of the acid chloride formed and the mixture is stirred at room temperature, at 50° C. and at 80° C., in each case for 2 hours. The temperature is then increased to 130° C. and maintained at this level for 6 hours, whereupon hydrogen chloride gas escapes, and the reaction mixture, which has initially become very thick, becomes mobile again.

For working up, the solvent is driven off with steam and the dyestuff formed is filtered off with suction, washed with water and dried.

131 g of a black-blue dyestuff powder are obtained.

Elementary analysis of the dyestuff thus prepared gave the following values:

| found | calculated for $C_{48}H_{28}N_{12}S_2O_4Co$ |
|---|---|
| C 59.6% | 60.1% |
| H 3.0% | 2.9% |
| N 17.1% | 17.5% |
| S 6.9% | 6.7% |
| O 6.8% | 6.7% |
| Co 5.9% | 6.1% |

This indicates that 2 mols of water have entered the resulting dithiocyano dyestuff of the formula

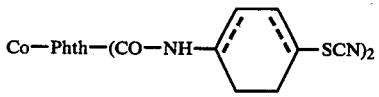

The dyestuff can be reduced with sodium hydroxide solution and hydrosulphite to give a yellow-brown solution and thus dyes cotton a brilliant turquoise shade which is very fast to washing and light. The dyestuff is particularly suitable for discharge printing by the rongalite potassium carbonate method.

If the procedure followed is as described above, but the p-thiocyanoaniline is replaced by the same amount of m-thiocyanoaniline, a dyestuff with similar coloristic properties is obtained.

EXAMPLE 2

322 g of a 29.5% strength aqueous paste of monochloro-copper phthalocyanine-tricarboxylic acid (prepared by condensation of 4-chlorophthalic acid and trimellitic acid, in a molar ratio of 1:3, with copper chloride, ammonium molybdate and urea in boiling trichlorobenzene and subsequent alkaline hydrolysis of the triamide formed) are dispersed in 1,300 ml of xylene with 16 g of the sodium salt of diisobutylnaphthalenesulphonic acid or a dispersing agent with a similar action, and the dispersion is then freed from water by distillation using a water separator. 80 ml of thionyl chloride are added to the resulting suspension, and the mixture is stirred, whilst cooling under reflux, at 80° C. and at 110° C., in each case for 6 hours. The excess thionyl chloride is then removed as described in Example 1 and the mixture is cooled to room temperature. 68 g of p-thiocyanoaniline are then stirred in, and, after the mixture has been stirred at room temperature for 2 hours, 32 ml of pyridine are added dropwise and stirring is continued at room temperature and at 50° C., in each case for 2 hours. The dyestuff formed is separated off by filtration, washed with methanol and dried.

This gives 146 g of a blue dyestuff which, with sodium sulphide solution, forms a yellow-green vat from which cotton is dyed a luminous turquoise.

What is claimed is:

1. Phthalocyanine dyestuffs of the formula

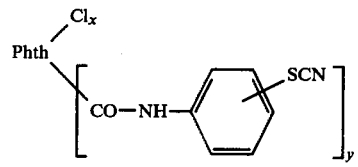

wherein Phth is a cobalt phthalocyanine moiety;
x is a number from 0 to 3;
y is a number from 1 to 4 and the sum of x and y is 4 or less; the thiocyanate moiety is meta or para to the amino; and addition products thereof formed with water in the presence of acids.

2. Process for the preparation of phthalocyanine dyestuffs according to claim 1 comprising converting a phthalocyaninecarboxylic acid of the formula

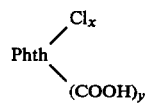

to the corresponding acid halide of the formula

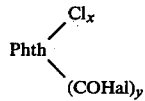

wherein Hal denotes chlorine or bromine, and subjecting the acid halide to a condensation reaction with m- or p-thiocyanoaniline in an inert, organic diluent.

3. Process according to claim 2 wherein the inert diluent is chlorobenzene, xylene, o-dichlorobenzene or nitrobenzene.

4. Process according to claim 2 wherein the reaction is conducted in the presence of an acid acceptor.

5. Process according to claim 4 wherein the acid acceptor is pyridine, quinoline, lower trialkylamine or excess thiocyanoaniline.

6. Process according to claim 2 wherein the acid halide is reacted with thiocyanoaniline in the form of the mixture in which it is formed without being intermediately isolated but after excess halogenating agent is removed from the mixture.

7. In the process fo dyeing and printing a material of natural or regenerated cellulose with a phthalocyanine dyestuff, the improvement comprises said phthalocyanine dyestuff being a dyestuff according to claim 1.

8. Cellulose materials dyed or printed with a phthalocyanine dyestuff according to claim 1.

* * * * *